US012747670B1

(12) United States Patent
Bown

(10) Patent No.: US 12,747,670 B1
(45) Date of Patent: Sep. 29, 2026

(54) PROPELLER ASSEMBLY INCLUDING A RIGGING FREE BETA TUBE

(71) Applicant: GE AVIATION SYSTEMS LIMITED, Gloucestershire (GB)

(72) Inventor: Nicholas Bown, Corsham (GB)

(73) Assignee: GE AVIATION SYSTEMS LIMITED, Cheltenham (GB)

(*) Notice: Subject to any disclaimer, the term of this patent is extended or adjusted under 35 U.S.C. 154(b) by 0 days.

(21) Appl. No.: 19/302,881

(22) Filed: Aug. 18, 2025

(30) Foreign Application Priority Data

Jun. 19, 2025 (GB) ...................................... 2509740

(51) Int. Cl.
*F01D 7/00* (2006.01)

(52) U.S. Cl.
CPC ............ *F01D 7/00* (2013.01); *F05D 2260/70* (2013.01)

(58) Field of Classification Search
CPC ....... B64C 11/38; B64C 11/385; B64C 11/14; B64C 11/30; B64C 11/18; B64C 11/305; B64C 11/06; B64C 11/301; B64C 27/64; F01D 25/18; F01D 7/00; F01D 25/16; F01D 17/16; F01D 25/162; F01D 25/20; F01D 25/246; F01D 5/021; F05D 2220/323; F05D 2260/76; F05D 2260/74; F05D 2220/36; F05D 2260/70; F05D 2260/98; F05D 2260/79; F05D 2270/62; B64D 2033/0293; B64D 2027/005; F02C 7/04; F02C 7/06; F02C 9/58; F04D 29/323
See application file for complete search history.

(56) References Cited

U.S. PATENT DOCUMENTS

| | | | | |
|---|---|---|---|---|
| 5,174,718 | A * | 12/1992 | Lampeter ................ | B64C 11/38 416/157 R |
| 5,364,231 | A | 11/1994 | Eick et al. | |
| 5,391,055 | A * | 2/1995 | Carvalho ................ | B64C 11/38 416/157 R |
| 5,897,293 | A * | 4/1999 | Arel ...................... | B64C 11/303 416/49 |
| 6,077,040 | A * | 6/2000 | Pruden .................... | B64C 11/38 416/157 R |
| 7,296,969 | B2 * | 11/2007 | Raes ...................... | B64C 11/06 416/36 |
| 8,439,640 | B2 * | 5/2013 | Arel ...................... | B64C 11/40 416/157 R |
| 9,951,651 | B2 * | 4/2018 | Frantz .................... | F01D 25/18 |
| 10,415,693 | B2 | 9/2019 | Altamura | |
| 10,472,050 | B2 * | 11/2019 | Futa, Jr. ................. | B64C 11/38 |
| 10,850,831 | B2 | 12/2020 | Futa, Jr. et al. | |
| 11,161,598 | B2 | 11/2021 | Garabello et al. | |
| 11,479,339 | B2 * | 10/2022 | Danielson ............... | B64C 11/38 |
| 11,519,346 | B2 | 12/2022 | Cervelli et al. | |

(Continued)

*Primary Examiner* — Eric J Zamora Alvarez
(74) *Attorney, Agent, or Firm* — Hanley, Flight & Zimmerman, LLC

(57) ABSTRACT

An example apparatus includes a propeller assembly including a blade and a propeller shaft, the propeller shaft including a first gallery and a second gallery; and a beta tube rotationally fixed to the propeller shaft, the beta tube axially translating with respect to the propeller shaft, the beta tube including a first connection, the first connection to provide hydraulic fluid to a pitch chamber to adjust a pitch of the blade to a first pitch angle, the first connection fluidly coupled to the first gallery of the propeller shaft based on a position of the beta tube.

20 Claims, 7 Drawing Sheets

(56) References Cited

U.S. PATENT DOCUMENTS

| | | | | |
|---|---|---|---|---|
| 12,037,100 | B2 | 7/2024 | Castellani et al. | |
| 12,065,234 | B2 | 8/2024 | Calkins et al. | |
| 2018/0306053 | A1 | 10/2018 | Chapman | |
| 2019/0031319 | A1 * | 1/2019 | Calkins | B64C 11/44 |
| 2020/0298959 | A1 | 9/2020 | Castellani et al. | |
| 2023/0159155 | A1 * | 5/2023 | Marger | B64C 11/06<br>416/147 |

* cited by examiner

PROPELLER ASSEMBLY INCLUDING A RIGGING FREE BETA TUBE

FIELD OF THE DISCLOSURE

The present disclosure relates generally to a propeller assembly and, more particularly, to a propeller assembly including a rigging free beta tube.

BACKGROUND

Many systems (e.g., boats, aircrafts, fluid pumps, etc.) include a propeller assembly. For example, engines (e.g., turbofan engines, turboprop engines, electric engines, etc.), such as those used on aircraft, generally include a propeller/fan and an engine to drive the propeller/fan to produce thrust. In some configurations, the propeller/fan has variable pitch blades. As such, the pitch of the blades can be changed during different phases of operation.

BRIEF DESCRIPTION OF THE DRAWINGS

A full and enabling disclosure of the presently described technology, including the best mode thereof, directed to one of ordinary skill in the art, is set forth in the specification, which makes reference to the appended FIGS., in which.

Figure 1A:
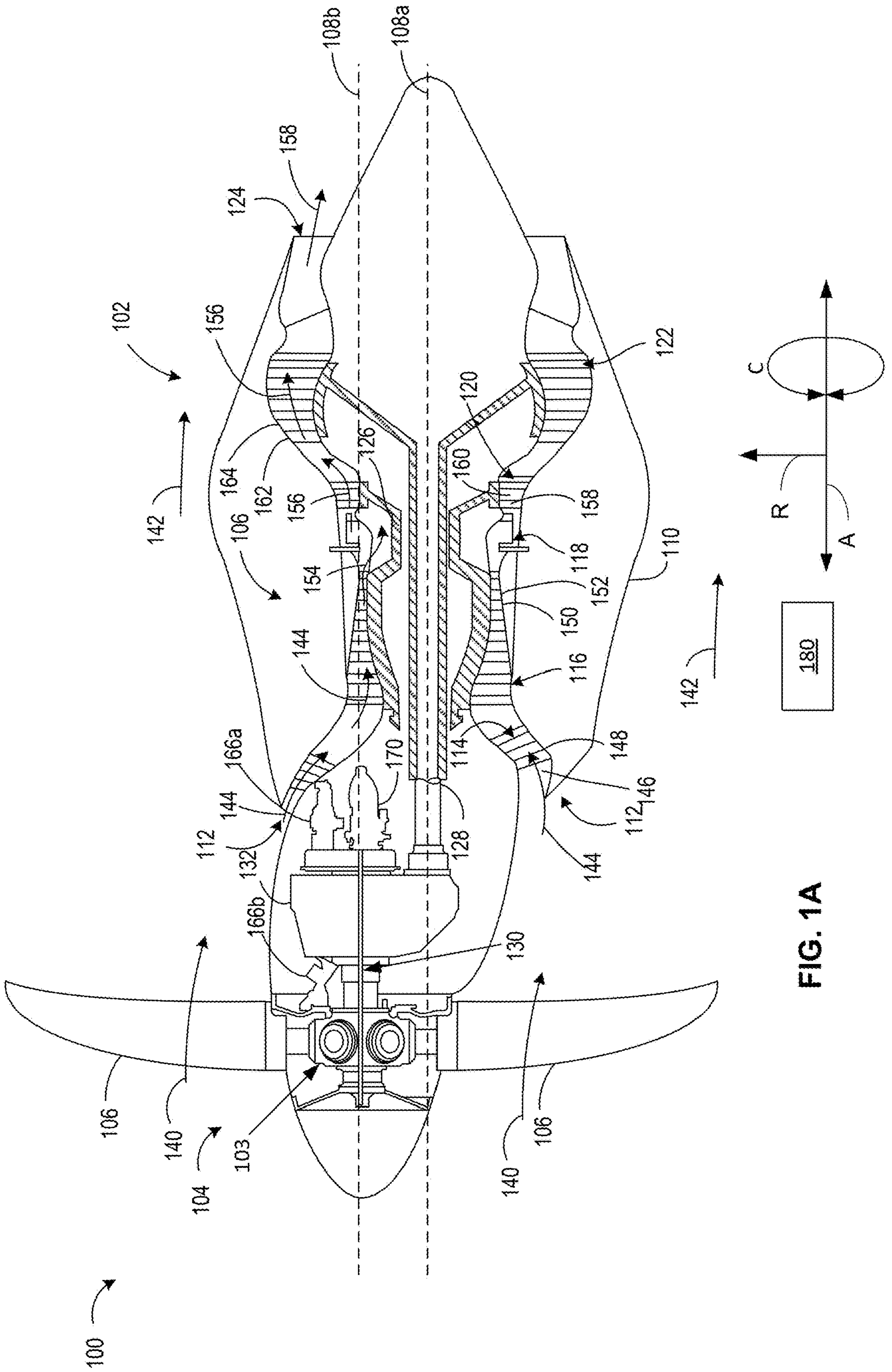
FIG. 1A is a schematic cross-sectional view of an example propeller installation, in this case coupled via a gearbox to a gas turbine engine in which examples disclosed herein can be implemented.

The figures are not to scale. Instead, the thickness of regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" and/or "direct contact" with another part means that there is no intermediate part between the two parts.

DETAILED DESCRIPTION

Reference now will be made in detail to embodiments or examples of the presently described technology, one or more examples of which are illustrated in the drawings. Each example is provided by way of explanation of the presently described technology, not a limitation of the presently described technology. In fact, it will be apparent to those skilled in the art that various modifications and variations can be made in the presently described technology without departing from the scope or spirit of the presently described technology. For instance, features illustrated or described as part of one embodiment or example can be used with another embodiment or example to yield a still further embodiment or example. Thus, it is intended that the presently described technology covers such modifications and variations as come within the scope of the appended claims and their equivalents.

When introducing elements of various embodiments of the present disclosure, the articles "a," "an," "the," and "said" are intended to mean that there are one or more of the elements. As used herein, the terms "first," "second," and "third" may be used interchangeably to distinguish one component from another and are not intended to signify location or importance of the individual components. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the terms "axial" and "longitudinal" both refer to a direction parallel to the centerline axis of a propeller while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the propeller or associated powerplant system towards the centerline axis of the same, and "radially outward" refers to the radial direction from the centerline axis of the propeller or associated powerplant system towards the outer circumference of the same.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Additionally, although individual features may be included in different examples or claims, these may possibly be combined, and the inclusion in different examples or claims does not imply that a combination of features is not feasible and/or advantageous.

Some powerplants used on aircraft, such as turboprop engines, unducted fan (UDF) engines, electric motor drive propellers, and high bypass turbofan engines have variable pitch blades or vanes. In particular, the pitch (e.g., angle) of the blades relative to the incoming airflow can be changed during operation of the engine. This enables optimal operation of the turbo engine during the various flight phases. These types of engines include a blade pitch control system to control the pitch of the blades. The blade pitch control system is hydraulically powered. Some engines utilize protection systems (also referred to as pitch control protection systems) to automatically adjust blade pitch in the event of a failure, provide alternative feathering, auto-feathering, enable ground range (e.g., low pitch angle), and/or when blade propeller speed is too high. For example, based on pilot control or in the event of failure of the hydraulic system and/or engine shut down during flight, it is desirable for the blades to move to a certain pitch position, referred to as a feather position, in which the blades cause the least (e.g., minimal) amount of resistance or drag. In some instances, the feather position corresponds to a position or angle in which the blades are substantially aligned (e.g., ±5°) with the direction of the incoming airflow. Ground range corresponds to moving the blade to a low pitch angle (e.g., for low speed operations such as taxi or select reverse thrust). Accordingly, protection systems may prevent the blade from going to such a fine pitch unless the aircraft is grounded (e.g., not inflight).

The propeller assembly includes a beta or oil transfer tube, typically consisting of two concentric tubes to form two independent oil flow paths but single line systems with a single tube are also employed. In some examples, such as a single oil line system, the coarse side oil pressure may be replaced by the forces provided by a mechanical spring and/or blade counterweights corresponding to a coarse blade angle. The location of the beta tube corresponds to the pitch of the propeller blades. For example, the beta tube allows hydraulic fluid to be pumped into a fine chamber or a coarse chamber. If hydraulic fluid is pumped into the fine chamber, pressure builds to push a piston attached to the beta tube into a first position, which causes the propeller blades to adjust to a fine pitch. Likewise, if hydraulic fluid is pumped into a coarse chamber, pressure builds to push the piston into a second position, which causes the propeller blades to adjust to a coarse pitch. The beta tube includes passages for the hydraulic fluid to flow into a fine chamber or a coarse chamber for dual line systems. As hydraulic fluid is pumped into the coarse chamber, the beta tube is pushed to a position that corresponds to a coarse pitch of the propeller blades as the hydraulic fluid in the fine pitch chamber is forced (e.g., via the pressure caused by movement of the piston or by a spring) back toward a reservoir (hydraulically accessible to the pumps (166*a* and 166*b*)) via a passage of the beta tube and control valves. As hydraulic fluid is pumped into the fine chamber, the beta tube is pushed to a position that corresponds to a fine pitch of the propeller blades. Hydraulic fluid may include a liquid, such as oil or water, used in hydraulic system to transmit power, lubricate moving parts, and/or cool a system.

Powerplant systems include bearings that transfer thrust/drag loads from propeller to the rest of the aircraft via a gearbox. However, such bearing configurations inherently include a degree of end float and are subject to wear, therefore the position of the beta tube with respect to the static part of the powerplant can move axially as a result of the bearing end float and associated wear, which can lead to variability in the blade pitch angle for a given beta tube position with respect to the source of the oil feed within the static components of powerplant. For example, if the position of the beta tube is not adjusted to account for end float variability due to wear, control to adjust the pitch to a particular angle may result in a different angle, which could limit the thrust or drag available from the propeller and be potentially dangerous. As used herein, end float is an amount of lengthwise movement that a shaft can make. Accordingly, traditional propeller assembly requires rigging to calibrate the axial position of the beta tube.

Rigging is a manual process in which a user, mechanic, etc., performs a series of adjustments and tests to recalibrate the beta tube position. Rigging may be required after key components are changed, after a number of hours operation, during maintenance, etc. Due to the complexity, manual effort, time, etc. associated with rigging, customers desire a rig-free propeller assembly that does not need to adjust the position of the beta tube. Although demand for such a rig-free system is high, there does not exist a rig-free solution on the market.

Examples disclosed herein include an extended or modified propeller shaft that includes opening for hydraulic fluid to flow into a beta tube. The extended propeller shaft encloses the beta tube with one or two channels that allow hydraulic fluid to be pumped into a first chamber or a second chamber. When the hydraulic fluid is pumped into the first chamber, the beta tube moves in a first direction, which causes the propeller blades to change pitch in a first direction. When hydraulic fluid is pumped into the second chamber, the beta tube moves in a second direction, which causes the propeller blades to change pitch in a second direction opposite the first direction. In the case of a single oil line system, the movement in the second direction may be caused by counterweight or spring forces. The structure of the extended or modified propeller shaft, openings, and/or connections with the beta tube restructure the propeller system integration to provide a rig-free solution. Examples disclosed herein also provide an opportunity to reduce hydraulic fluid leakage within a propeller assembly.

Additionally, conventional propeller systems include a risk that the beta tube can catch and bind in a transfer sleeve (rotating to static close clearance fit), which can cause the beta tube to be twisted and result in failure. Because examples disclosed herein structure the beta tube within a rotating component where clearances are tight, examples disclosed herein also reduce or eliminate the risk of the beta tube catching and/or binding, reducing system failure.

Referring now to the drawings, wherein identical numerals indicate the same elements throughout the figures, FIG. 1A is a schematic cross-sectional view of an example propeller installation on an engine (e.g., a turbo prop engine) assembly 100 (herein also referred to as a turboprop engine assembly) that can incorporate various examples disclosed herein. In this example, the engine assembly 100 includes a turboprop-type of engine, referred to herein as the turboprop engine. However, the principles of the present disclosure are also applicable to other types of engines, such as turbofan engines (e.g., high-bypass turbofan engines, low-bypass turbofan engines), unducted fan (UDF) engines (sometimes referred to as propfans), electric propulsion engine, a hybrid engine, and/or other types of engines having a propulsor (e.g., a fan, a propeller, etc.) with variable pitch blades or vanes. Further, the examples disclosed herein can also be used in connection with other types of applications, such as electric fans or wind turbines having variable pitch blades.

As shown in FIG. 1A, the engine assembly 100 includes a gas turbine engine 102 (which may also be referred to as a core turbine engine or turbo-machine) and a propeller assembly 104 including a plurality of blades 106 (sometimes referred to as rotors or vanes). The propeller assembly 104 can include any number of blades 106. The gas turbine engine 102 is disposed downstream from the propeller assembly 104 and drives the blades 106 of the propeller assembly 104 to produce forward thrust. In some examples, the propeller assembly 104 is positioned behind the gas turbine engine 102. As shown in FIG. 1A, the engine assembly 100 and/or the gas turbine engine 102 define a longitudinal or axial centerline axis 108*a* extending there through for reference. However, in the example of FIG. 1A, the propeller axis 108*b* is not aligned with the axial centerline axis 108*a* due to the offset gearbox 132. However, some engine assemblies may include a different gearbox causing the propeller axis 108*b* to be the same as the axial centerline axis 108*a*. FIG. 1A also includes an annotated directional diagram with reference to an axial direction A, a radial direction R, and a circumferential direction C. In general, as used herein, the axial direction A is a direction that extends generally parallel to the centerline axis 108*a*, the radial direction R is a direction that extends orthogonally outward from or inward toward the centerline axis 108*a*, and the circumferential direction C is a direction that extends concentrically around the centerline axis 108*a*. Further, as used herein, the term "forward" refers to a direction along the centerline axis 108*a* in the direction of movement of the engine assembly 100, such as to the left in FIG. 1A, while the term "rearward" refers to a direction along the centerline axis 108*a* in the opposite direction, such as to the right in FIG. 1A.

The gas turbine engine 102 includes a substantially tubular outer casing (which may also be referred to as a mid-casing) that defines an annular inlet 112. The outer casing 110 of the gas turbine engine 102 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124. The gas turbine engine 102 includes a high-pressure shaft or spool 126 ("HP shaft 126") that drivingly couples the HP turbine 120 and the HP compressor 116. The gas turbine engine 102 also includes a low-pressure shaft or spool 128 ("LP shaft 128" also referred to as an engine shaft) that drivingly couples the LP turbine 122 and the LP compressor 114. The LP shaft 128 also couples to the propeller drive shaft (300—FIG. 3) via a series of gears. A beta tube 130 is connected to the pitch change piston within the propeller assembly and is housed within a propeller shaft or a fan shaft). The blades 106 are coupled to and extend radially outward from a propeller hub 103. In this example, the blades 106 are variable pitch blades. As such, the pitch of the blades 106 can be changed during operation of the engine assembly 100 to improve efficiency and achieve certain flow characteristics during different phases of flight. Example systems for changing the pitch of the blades 106 are disclosed in further detail herein. In the example of FIG. 1A, the LP shaft 128 is coupled to a propeller shaft (e.g., a shaft that rotates to rotate the blades 106) via an offset reduction gearbox 132 (i.e., an indirect-drive or geared-drive configuration). In some examples, the LP shaft 128 may be coupled directly to the propeller shaft (i.e., a direct-drive configuration). While in this example the gas turbine engine 102 includes two compressors 114, 116 and two turbines 120, 122, in other examples, the gas turbine engine 102 may only include one compressor and one turbine. Additionally, some/other components may be removed, added, and/or combined for different types of turbo propeller engine assemblies or may be replaced with an alternative source of shaft power (e.g., an electric motor).

As illustrated in FIG. 1A, during operation of the engine assembly 100, incoming air 140 enters the propeller assembly 104 and is accelerated by the blades 106. A first portion 142 of the air 140 flows along the outside of the gas turbine engine 102, while a second portion 144 of the air 140 flows into the inlet 112 of the gas turbine engine 102 (and, thus, into the LP compressor 114). One or more sequential stages of LP compressor stator vanes 146 and LP compressor rotor blades 148 coupled to the LP shaft 128 progressively compress the second portion 144 of the air 140 flowing through the LP compressor 114 en route to the HP compressor 116. Next, one or more sequential stages of HP compressor stator vanes 150 and HP compressor rotor vanes 152 coupled to the HP shaft 126 further compress the second portion 144 of the air 140 flowing through the HP compressor 116. This provides compressed air 154 to the combustion section 118 where it mixes with fuel and burns to provide combustion gases 156.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the propeller shaft 300 via the gearbox. The combustion gases 156 then exit the gas turbine engine 102 through the exhaust section 124 thereof. The combustion gases 156 mix with the first portion 142 of the air 140 to produce propulsive thrust.

Along with the engine assembly 100, the gas turbine engine 102 serves a similar purpose and sees a similar environment in land-based gas turbines, and turbofan and turbojet engines in which the ratio of the first portion 142 of the air 140 to the second portion 144 of the air 140 is different. In each of the engines, a speed reduction device (e.g., the reduction gearbox 132) may be included between any shafts and spools. For example, the reduction gearbox 132 may be used to mechanically couple the LP shaft 128 and a propeller shaft that includes the beta tube 130. Thus, the gearbox 132 rotates the propeller shaft and beta tube 130 based on rotation of the LP shaft 128.

The hydraulic pump 166*a* of FIG. 1A is a conveyer of hydraulic power that pumps a hydraulic fluid. The hydraulic pump 166*a* acts as a pressure vessel to cause hydraulic fluid to flow (e.g., to be pumped) into one or more control valves of a pitch control unit (PCU) 170 to move the beta tube 130, via the pitch actuation piston, in a forward direction or an aft direction, as further described below. The hydraulic fluid may be an oil-based fluid, a silicone-based fluid, a synthetic hydrocarbon-based fluid, a water-based fluid, and/or another type of hydraulic fluid.

The hydraulic pump 166*b* of FIG. 1A is a conveyer of hydraulic power that pumps a hydraulic fluid when the hydraulic fluid from the hydraulic pump 166*a* is insufficient (e.g., due to a loss of primary oil supply). The hydraulic pump 166*a* causes hydraulic fluid to flow (e.g., to be pumped) into one or more control valves of the PCU 170 to move the beta tube 130 via the pitch actuation piston, in a forward direction or an aft direction, as further described below. The hydraulic fluid may be an oil-based fluid, a silicone-based fluid, a synthetic hydrocarbon-based fluid, a water-based fluid, and/or another type of hydraulic fluid. In some examples, the hydraulic pump 166*a*, 166*b* are linked together and/or otherwise connected to each other.

The engine assembly 100 of FIG. 1A includes the pitch control unit 170. The pitch control unit 170 is a system to change the pitch of the blades 106 in response to a trigger (e.g., instructions from a user or another controller), based on a measured pitch being different from an intended pitch, propeller speed, an error, a fault, instruction for a forbidden action (e.g., decrease pitch to ground pitch angle when in flight), power or signal loss, etc. The pitch control unit 170 can automatically adjust the pitch of the blade 106 to reduce air drag automatically after a malfunction or error to reduce the hazard associated with the malfunction or error. The trigger may be one or more signals from a full authority digital engine control (FADEC) 180 and/or any other propeller controller (e.g., such as a propeller electronic controller (PEC)). In some examples, in response to a power outage or error, the FADEC 180 can be powered by a backup power supply and/or battery and output one or more control signals to the pitch control unit 170 to cause the pitch control unit 170 to change the pitch of the blades 106. The pitch control unit 170 includes a hydraulic system with valves to allow fluid to flow from a feathering pump 166*b* and/or a high pressure (HP) pump 166*a* into a valve assembly that adjusts the pitch of the blades 106 by moving a piston to which the beta tube 130 is attached in the forward direction or the aft direction, as further described below.

The FADEC 180 is a controller and/or computing system that controls aspects of engine performance. The FADEC 180 can detect and/or determine an error related to power failure, pressure loss, propeller PCU malfunction, and/or other situation where automatic and/or passive adjustment of the pitch of the blades 106 is needed and/or desired. The FADEC 180 outputs one or more control signals to the pitch control unit 170 to change the pitch of the blades 106 (e.g., between a fine pitch, a coarse pitch, a ground pitch, and a feathered pitch). In some examples, the FADEC 180 can utilize characteristics of the engine and/or flight and/or user/manufacturer preferences to determine what pitch angle to apply the blades 106. For example, the FADEC 180 can cause automatic feathering of the blades 106 based on a triggering event. For example, the FADEC 180 may trigger a first pitch angle (also referred to as a first pitch) for the blades 106 after an error occurs during takeoff or landing and may use a second pitch angle (also referred to as a second pitch) for the blades 106 after an error occurs during regular flight. Additionally, the FADEC 180 may control the speed of the adjustment of the pitch of the blades 106 based on characteristics of the engine and/or flight and/or user/manufacturer preferences.

Figure 1B:
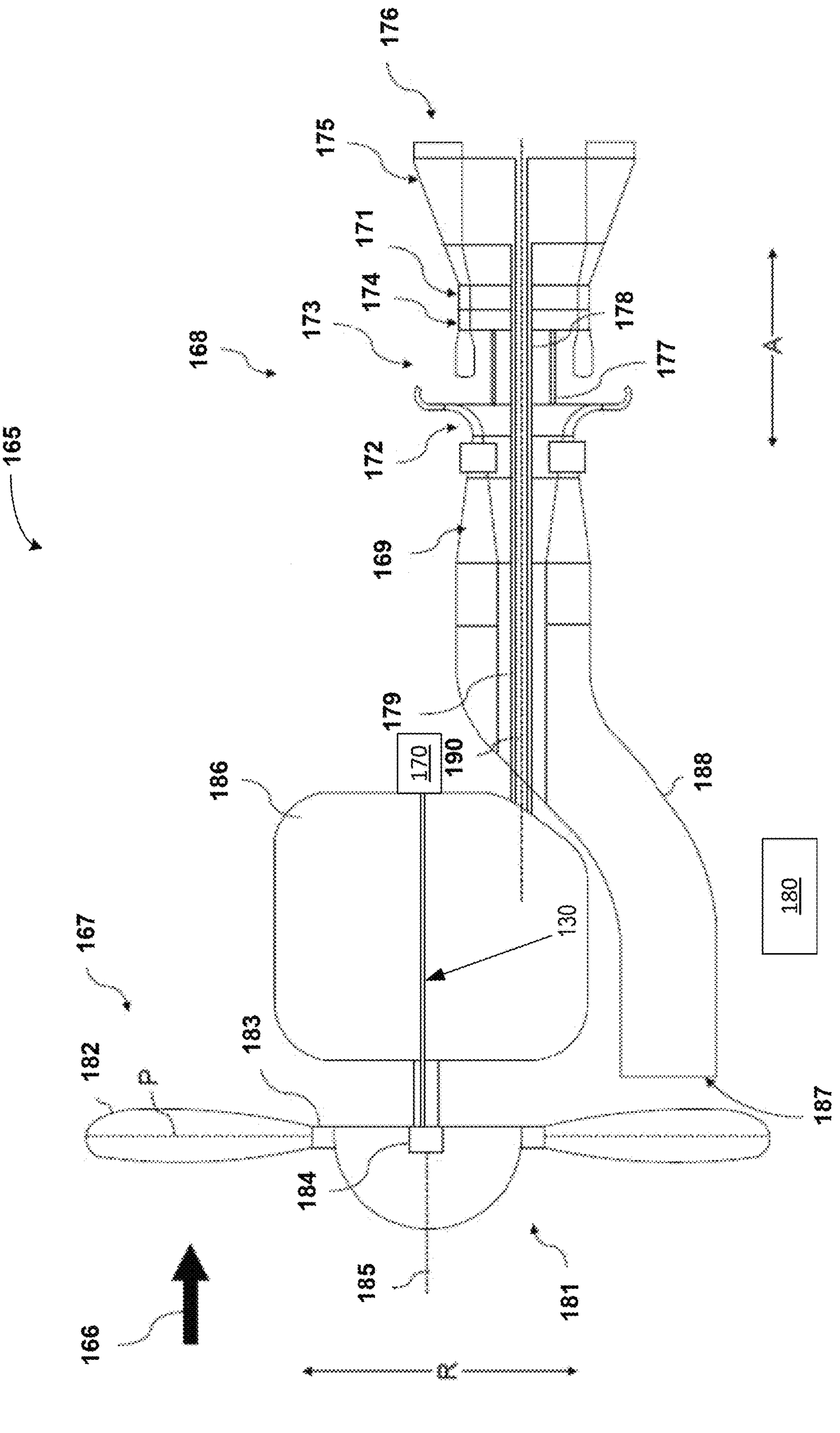
FIG. 1B is a schematic cross-sectional view of an example turboprop in which examples disclosed herein can be implemented.

FIG. 1B is a schematic cross-sectional view of a gas turbine engine in accordance with examples disclosed herein. More particularly, for the embodiment of FIG. 1B, the gas turbine engine is a turboprop engine 165. As shown in FIG. 1B, the turboprop engine 165 defines an axial direction A (extending parallel to a longitudinal centerline or central axis 190 provided for reference), a radial direction R, and a circumferential direction C (not shown) disposed about the axial direction A. The turboprop engine 165 generally includes a propeller section 167 and a turbomachine 168 disposed aft of the propeller section 167 from an aircraft perspective, the propeller section 167 being operable with, and driven by, the turbomachine 168. The turboprop engine 165 includes the pitch control system 170 and the FADEC 180 of FIG. 1B.

The turbomachine 168 includes, in a serial flow relationship, a booster compressor 169, a high pressure (HP) compressor 172, a combustion section 173, a high pressure (HP) turbine 174, an intermediate pressure (IP) turbine 171, a low pressure (LP) turbine 175, and an exhaust section 176. An air flow path generally extends through the booster compressor 169, the HP compressor 172, the combustion section 173, the HP turbine 174, the IP turbine 171, the LP turbine 175, and the exhaust section 176 which are in fluid communication with each other.

In some examples, the HP turbine 174 can include at least two stages of HP turbine rotor blades. Such a configuration may ensure a sufficient amount of power is provided to the HP compressor 172.

An HP shaft or spool 177 drivingly connects the HP turbine 174 to the HP compressor 172. An IP shaft 178 drivingly connects the IP turbine 171 to the booster compressor 169. An LP shaft or spool 179 drivingly connects the LP turbine 175 to propeller section 167 of the turboprop engine 165. The turbomachine 168 includes a drive turbine drivingly coupled to a drive turbine shaft configured to provide an output torque to, e.g., the propeller section 167 in the embodiment shown. For the depicted example, the drive turbine is the LP turbine 175 and the drive turbine shaft is the LP shaft 179.

For the depicted example, the propeller section 167 includes a variable pitch propeller 181 having a plurality of propeller blades 182 coupled to a hub 183 in a spaced apart manner. As depicted, the propeller blades 182 extend outwardly from the hub 183 generally along the radial direction R. Each propeller blade 182 is rotatable relative to the hub 183 about a pitch axis P by virtue of the propeller blades 182 being operatively coupled to a suitable actuation member 184 configured to collectively vary the pitch of the propeller blades 182, e.g., in unison. The propeller blades 182, the hub 183, and the actuation member 184 are together rotatable about a centerline 185 by an LP shaft 179 across a power gear box 186. The power gear box 186 includes a plurality of gears for stepping down the rotational speed of the LP shaft 179 to a more efficient rotational propeller speed and is attached to the core turbomachine 168 through one or more coupling systems. Additionally, for the embodiment shown, the power gear box 186 is an offset gear box, such that the propeller axis 185 is offset from the longitudinal centerline 190 of the turbomachine 168.

During operation of the turboprop engine 165, a volume of air 166 (also referred to as a free stream flow of air prior to its encounter with the propeller 181) passes through the blades 182 of the propeller 181 and is urged toward an inlet 187 of turbomachine 168. More specifically, turboprop engine 165 includes an intake channel 188 that extends from the inlet 187, which is non-axisymmetric with respect to longitudinal centerline 190, to the booster compressor 169, where the channel 188 is axisymmetric with respect to longitudinal centerline 190.

The booster compressor 169 and the HP compressor 172 each include one or more sequential stages of compressor stator vanes, one or more sequential stages of compressor rotor blades, an impeller, or combinations thereof. In particular, the booster compressor 169 is depicted as an axial compressor (having multiple stages of compressor stator vanes and rotor blades) and the HP compressor 172 is depicted as a centrifugal compressor (having an impeller).

Though the illustrated embodiment includes both axial and centrifugal flow compressors, in some forms the turboprop engine 165 can include just an axial flow compressor(s) or centrifugal flow compressor(s).

The HP compressor 172 directs compressed air into the combustion section 173 where the air mixes with fuel. The combustion section 173 includes a combustor which combusts the air/fuel mixture to provide combustion gases. The combustion gases flow through the HP turbine 174, the IP turbine 171, and the LP turbine 175. Each of these HP, IP, and LP turbines 174, 171, 175 includes one or more sequential stages of turbine stator vanes and one or more sequential stages of turbine rotor blades. The turbine rotor blades are coupled to a respective one of the HP shaft 177, the IP shaft 178, or the LP shaft 179 to extract thermal and/or kinetic energy from the combustion gases flowing therethrough. The energy extraction from the HP turbine 174 supports operation of the HP compressor 172 through the HP shaft 177, the energy extraction from the IP turbine 171 supports operation of the booster compressor 169 through the IP shaft 178, and the energy extraction from the LP turbine 175 supports operation of the propeller section 167 through the LP shaft 179 (across the power gear box 186). Combustion gases exit the turboprop engine 165 through the exhaust section 176.

In some examples, the turbine engine may include any suitable number of compressors, turbines, shafts, etc. For example, as will be appreciated, the HP shaft 177 and the LP shaft 179 may further be coupled to any suitable device for any suitable purpose. For example, the turboprop engine 165 of FIG. 1B may be utilized in aeroderivative applications. Additionally, the turboprop engine 165 may include any other suitable type of combustor, such as a reverse flow combustor.

Figure 2:
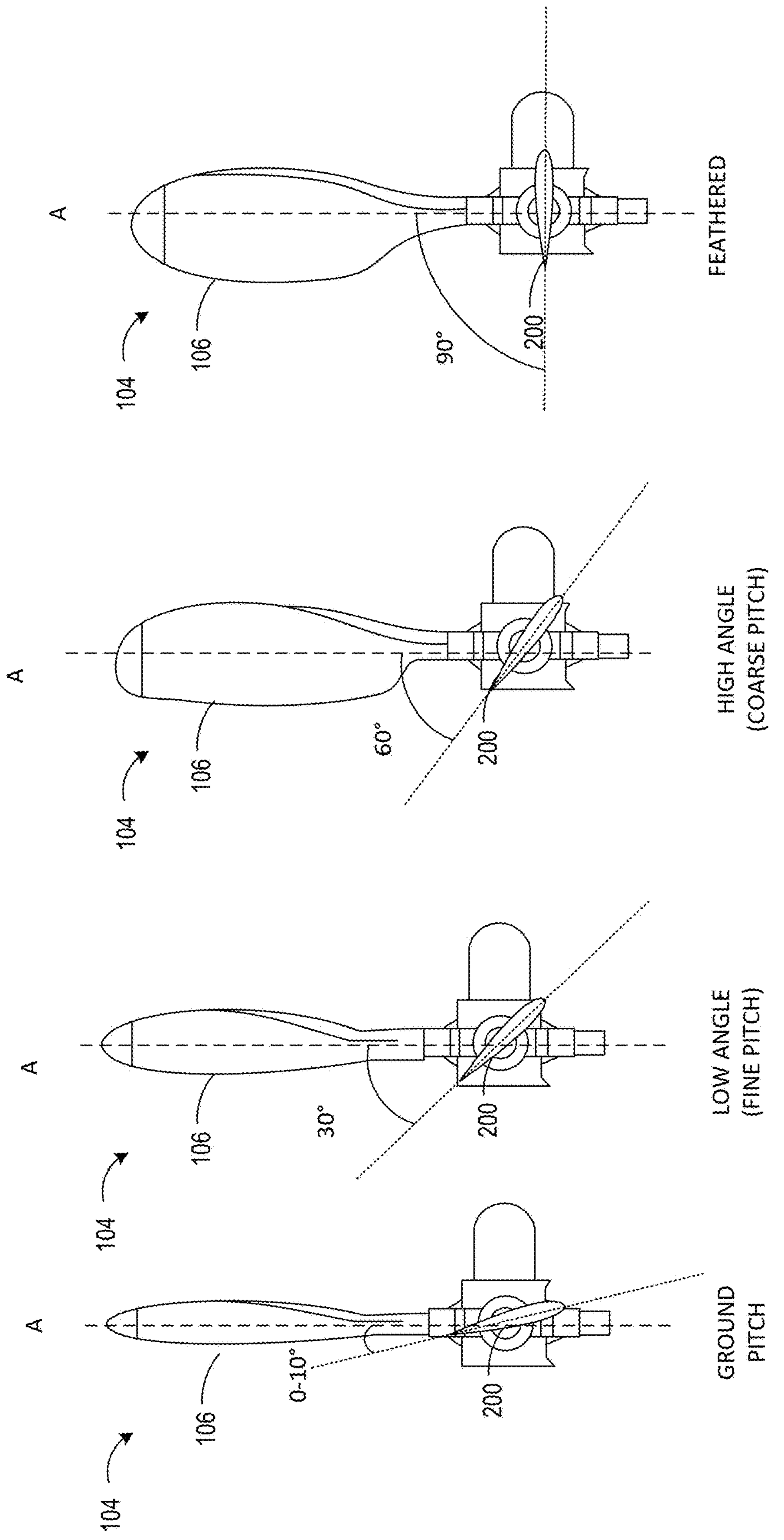
FIG. 2 includes side views of blades of the propeller of FIG. 1A in four different pitch angles.

FIG. 2 includes side views of blades 106 of the propeller assembly 104 of the engine assembly 100, 165 of FIGS. 1A and/or 1B and a side view of blades 200 of the engine assembly 100, 165 in four different pitch angles and/or positions (e.g., a ground pitch, fine pitch, coarse pitch, and feathered). In the example of FIG. 2, a ground angle of the blades 106, also referred to as ground pitch, is an angle that is less than a first threshold angle (e.g., less than 10 degrees) to the plane of rotation (e.g., corresponding to a plane containing line A and perpendicular to the axis of rotation). A low angle of the blades 106, also referred to as fine pitch, is an angle that is less than a second threshold (e.g., a second threshold between 10 and 45 degrees) to the plane of rotation (e.g., corresponding to line A). The pitch with the low angle corresponds to a first amount of drag (e.g., high drag). A high angle of the blades 106, also referred to as coarse pitch, is an angle that is greater than the second threshold but less than a third threshold (e.g., between 45 and 90 degrees) to the plane of rotation. The pitch with the high angle corresponds to a second amount of drag (e.g., medium drag). The feathered angle of the blades 106, also referred to as feathered pitch, is an angle that is 90 degrees to the plane of rotation. The pitch with the feathered angle corresponds to a third amount of drag (e.g., low drag). Although the feathered pitch in the example of FIG. 2 is 90 degrees, as described above, a feathered angle can vary by approximately ±5° from the 90-degree feathered pitch. As described above, the pitch control unit 170 can, based on inputs from a controller, adjust the pitch to any angle. The amount of pitch control and/or speed of pitch control may be based on user/manufacturer preference and/or based on characteristics of the flight and/or engine assembly 100. FIG. 2 illustrates example angles for different pitches corresponding to the engine assembly 100, 165 of FIGS. 1A and/or 1B. However, the angles may be different for different turbo propeller engines or propellers driven alternative engine configurations. For example, an engine assembly may define a ground pitch as a pitch between 12 and −17 degrees. Additionally, the angles may be different for propeller blades with different radius size.

Figure 3:
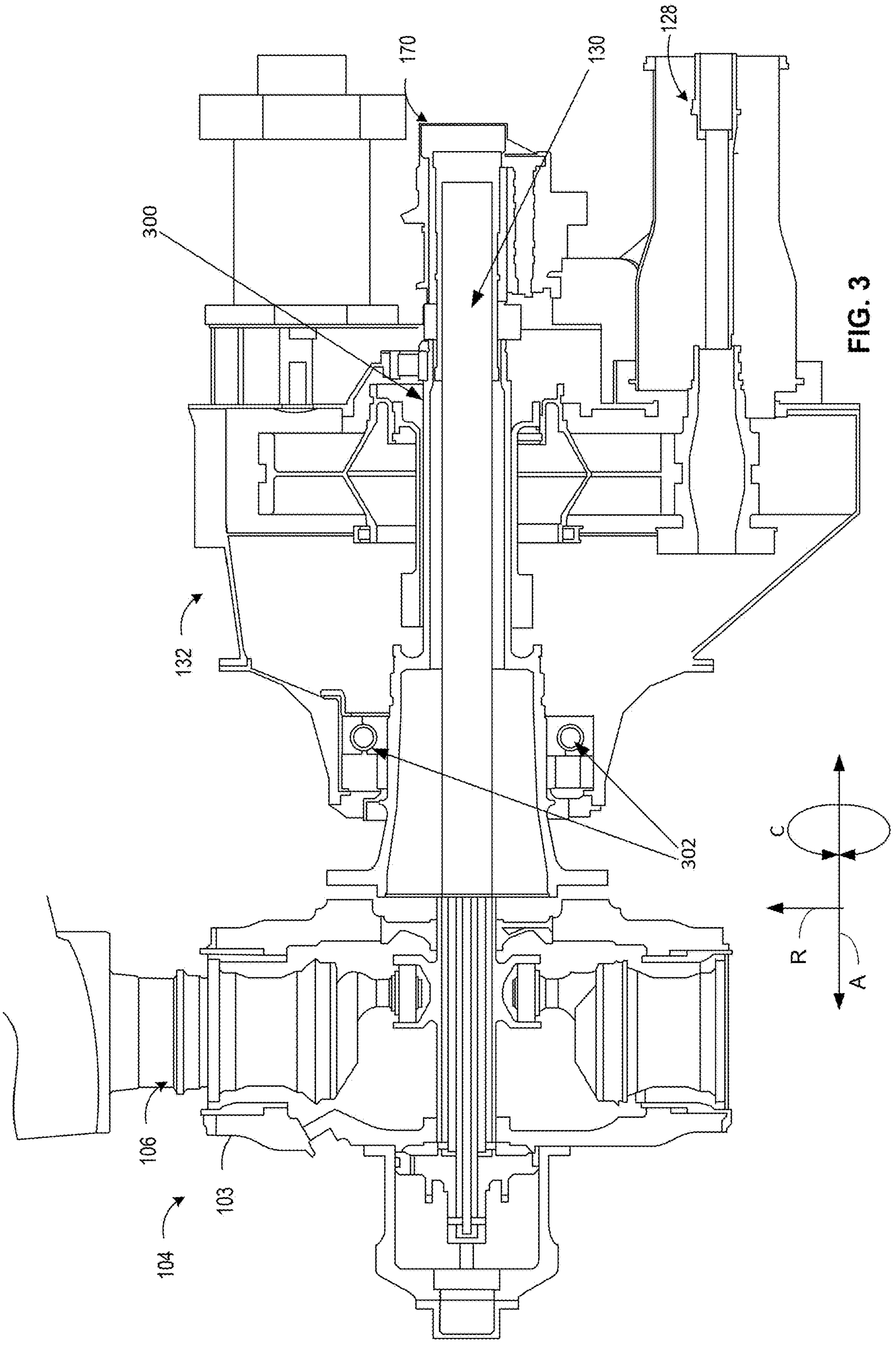
FIG. 3 illustrates a cross-sectional view of a portion of the components of the engine of FIG. 1A.

FIG. 3 illustrates a cross-sectional view of a portion of the LP shaft 128, the beta tube 130, the gearbox 132, and the PCU 170 of FIG. 1A. In some examples, FIG. 3 may illustrate a cross-sectional view of the LP shaft 179, the gear box 186, and the PCU 170 of FIG. 1B. FIG. 3 further includes an example propeller shaft 300, and example bearings 302.

The propeller shaft 300 of FIG. 3 is a shaft that connects to the blades 106, via the propeller assembly 104. and houses the beta tube 130. As described above, the gas engine 102 (FIG. 1A) rotates the LP shaft 128 and the gearbox 132 rotates the propeller shaft 300 based on the rotation of the LP shaft 128. The beta tube 130 is housed inside the propeller shaft 300 and the beta tube 130 is rotationally fixed to the propeller shaft 300 via the propeller hub 103. Thus, rotation of the propeller shaft 300 causes the beta tube 130 to also rotate. However, the beta tube 130 is free to slide with respect to the propeller shaft 300 in the axial direction. For example, the beta tube 130 can move forward or rearward with respect to the gearbox 132, which is fixed with respect to the turbine engine 102 in the axial direction. As further described below in conjunction with FIG. 4A, the beta tube 130 can move in the axial A direction within the propeller shaft 300 based on the flow of hydraulic fluid. The axial movement of the beta tube 130 adjusts the pitch angle of the blade 106 (e.g., movement of the beta tube 130 in a first direction causes the blade 106 to change to a coarse pitch angle and movement of the beta tube 130 in a second direction causes the blades 106 to change to a fine pitch angle).

The bearings 302 take radial and axial loads and transfer thrust/drag from the propeller assembly 104 to the gearbox 132. However, the bearings 302 inherently include a degree of end float and are subject to wear. Therefore, the position of the propeller assembly 104, and thus the beta tube 130, with respect to the static part of the engine assembly 100, can unintentionally move in the axial A direction as a result of the bearing end float and the associated wear. Because hydraulic fluid is pumped into the beta tube 130 via the PCU 170, a static part of the assembly, in traditional techniques any movement can misalign the connections between the PCU 170 and the beta tube 130. Thus, rigging may be needed to realign the connections. However, as described above, rigging is a long, complex, and manual process. As further described below in conjunction with FIGS. 4A, 4B and 5, examples disclosed herein provide a rig-free solution to beta tube movement caused by manufacturing tolerances, shaft end float and wear of the bearings 302. Although FIG. 3 illustrates the example bearings 302, there may be other bearings that can wear and cause the beta tube 130 to unintentionally move in the axial A direction.

Figure 4A:
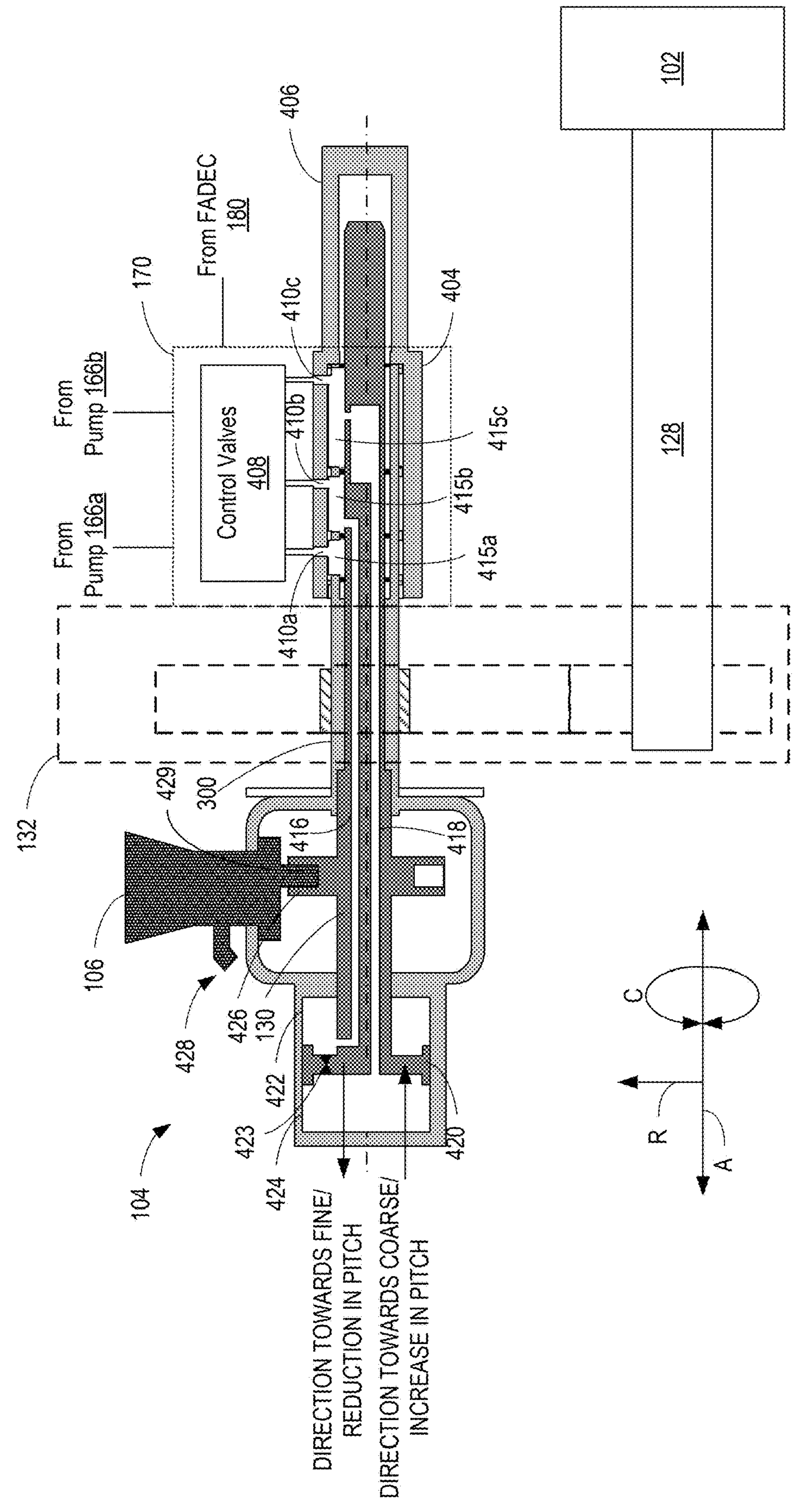
FIG. 4A illustrates an alternative example implementation with further details related to the blade, the beta tube, and the pitch control unit transfer sleeve of FIG. 3.

FIG. 4A illustrates an example implementation with further details related to the blade 106, the beta tube 130, the gearbox 132, and the example implementation of the pitch control unit 170 of FIG. 1A. The blade 106 includes a counterweight 428. The beta tube 130 attaches to a piston 420, incorporating hydraulic connections 416, 418, typically in the form of concentric tubes and a mechanical connection to a crosshead assembly 426 to facilitate pitch change of the blades via the offset operating pin 429 on the root of the blade. The crosshead assembly 426 may include or be replaced with a yolk or other mechanical assembly. The propeller assembly 104 includes the blade 106 of FIG. 1A, example cylinder chambers 422, 424, and the propeller shaft 300 of FIG. 3 that houses a portion of the beta tube 130. The pitch control unit 170 includes a PCU transfer sleeve 404, an example beta feedback transducer 406, and one or more control valves 408. FIG. 4A further includes the gas engine 102 and LP shaft 128 of FIG. 1A. As used herein, inputs may be referred to as ports, inputs, inlet, input connections, inlet connections, input terminals, inlet terminals, etc. As used herein, outputs may be referred to as ports, outputs, outlets, output connections, outlet connections, output terminals, outlet terminals, etc. Components that are connected via a solid line are connected via a connection, a tube, a hose, a pipe, and/or other device that can transport hydraulic fluid. Any depiction of connections where hydraulic fluid can flow (e.g., solid lines, the connections 416, 418, etc.) may be formed with concentric tubes). In FIG. 4A, the components are illustrated as cross sections of the respective components. Although FIG. 4A is described in conjunction with the engine assembly 100 of FIG. 1A, examples disclosed herein may be implemented in conjunction with another type of turbo engine assembly, turbo propeller assembly, and/or any other engine and/or powerplant assembly with pitch control. For example, FIG. 4A can be described in conjunction with FIG. 1B, where the engine 102 is replaced with the turbomachine 168 of FIG. 1B, the LP shaft 128 is replaced with the LP shaft 179 of FIG. 1B, and the gearbox 132 is replaced with the gearbox 186 of FIG. 1B.

The PCU 170 includes the control valves 408 that can be controlled by the FADEC 180 (or another controller, such as a PEC) to control hydraulic fluid from the pump(s) 166*a*, 166*b* to the openings 410*a*, 410*b*, 410*c* of the PCU transfer sleeve 404 and into the beta tube 130 via the galleries 415*a*, 415*b*, 415*c* of the propeller shaft 300, thereby causing hydraulic fluid to flow into one of the chambers 422, 424 to move the beta tube 130 and piston 420 forward or rearward in the orientation of FIG. 4A. As further described below, moving the beta tube 130 forward or rearward changes the pitch of the blade 106.

The PCU transfer sleeve 404 of FIG. 4A houses the beta tube 130 and allows the beta tube 130 to move forward or rearward based on hydraulic fluid being pumped into one or more of the openings 410*a*, 410*b*, 410*c* via the control valves 408 of the PCU 170. The PCU includes the transfer sleeve 404 and may include the beta feedback transducer 406. The beta feedback transducer 406 can sense/determine a position of the beta tube 130 and send the sensed/determined position information to the FADEC 180, and/or any other controller to provide feedback on the pitch of the blade 106 based on the position of the beta tube 130. The PCU transfer sleeve 404 includes the openings 410*a*, 410*b*, 410*c* to allow hydraulic fluid to be pumped from the control valves 408 into the beta tube 130 via the galleries 415*a*, 415*b*, 415*c* of the propeller shaft 300. As described above, in some designs, a propeller shaft does not interface with a transfer sleeve, which results in a need to rig the beta tube. However, as described herein, the structure of the beta tube 130, the propeller shaft 300 and the transfer sleeve 404 provides a rig-free design.

The openings 410*a*, 410*b*, 410*c* of the PCU transfer sleeve 404 provide a path that fluidly couples the ports of the control valves 408 to the chambers 422, 424 via the galleries 415*a*, 415*b*, 415*c* of the propeller shaft 300 and one or more of the fine chamber connection 416 or the coarse chamber connection 418 of the beta tube. For example, hydraulic fluid can be pumped into the fine pitch chamber 422 via the first opening 410*a* of the PCU transfer sleeve 404, the gallery 415*a* of the propeller shaft 300 and the connection 416 when the piston 420 is in a position where the first opening 410*a* is fluidly coupled to the fine chamber connection 416. Additionally, hydraulic fluid can be pumped into the fine pitch chamber 422 via the second opening 410*b* of the PCU transfer sleeve 404, the gallery 415*b* of the propeller shaft 300, and the connection 416 when the piston 420 is in a position where the opening 410*b* is fluidly coupled to the fine chamber connection 416. Additionally, hydraulic fluid can be pumped into the coarse pitch chamber 424 via the third opening 410*c* of the PCU transfer sleeve 404, the gallery 415*c* of the propeller shaft 300, and the connection 418 when the piston 420 is in a position where the third opening 410*c* is fluidly coupled to the coarse chamber connection 418. Additionally, hydraulic fluid can flow back into the control valves 408 from one of the chambers 422, 424 via the beta tube 130. In practice, the coarse chamber connection 418 may be always fluidly coupled to the third opening 410*c*. The openings 410*a*, 410*b*, 410*c* of the PCU transfer sleeve 404 are further illustrated and described below in conjunction with FIG. 5. The openings 410*a*, 410*b*, 410*c* are fluidly coupled to the respective galleries 415*a*, 415*b*, 415*c* of the propeller shaft 300.

The galleries 415*a*, 415*b*, 415*c* of FIG. 4A of the propeller shaft 300 may be partial annular (e.g., 350-degree, 340-degree, or some other degree less than 360 degree) open spaces or made up of multiple annular sectors or simply one or more discrete ports that provide a path for hydraulic fluid from the openings 410*a*, 410*b*, 410*c* to flow into the connection(s) 416, 418 based on the position of the beta tube 130. For example, when the connection 416 is aligned with the gallery 415*a*, hydraulic fluid can be pumped from the opening 410*a* into the chamber 422 to move the beta tube 130 into a ground pitch position. When the connection 416 is aligned with the gallery 415*b*, hydraulic fluid can be pumped from the opening 410*b* into the chamber 422 to move the beta tube 130 into the fine pitch position but not further to the left into the ground pitch range. For example, the galleries 415*a*, 415*b* are separated by a seal (e.g., a close tolerance fit, a bushing, etc.). When the piston 420, which separates the coarse and fine chambers 422, 424, moves due to the fluid being pumped into one or the chambers 422, 424, so do the ports of the beta tube 130. If high pressure is available at both 415*a* and 415*b* (e.g., hydraulic fluid is being pumped into galleries 415*a*, 415*b*), then the piston 420 can be driven to connect to gallery 415*a* to the port of the beta tube 130 that connects to the fine chamber 422. If high pressure is not available at the gallery 415*a*, then once the connection to the gallery 415*b* is broken, the piston 420 cannot move any further toward the left, in the configuration of FIG. 4A. When the connection 418 is aligned with the gallery 415*c*, hydraulic fluid can be pumped from the opening 410*c* into the chamber 424 to move the beta tube 130 into a coarse position. When the propeller shaft 300 rotates, hydraulic fluid can semi-continuously be pumped in, because regardless of the orientation of the connections 416, 418, the galleries 415*a*, 415*b*, 415*c* are always fluidly coupled to the connections 416, 418 due to the annularity of the galleries 415*a*, 415*b*, 415*c*. Further details of the example structure of the openings 410*a*-410*c* and the galleries 415*a*-415*c* are further provided below in conjunction with FIG. 5.

Incorporating the galleries 415*a*, 415*b*, 415*c* of the propeller shaft 300 and incorporating the openings 410*a*, 410*b*, 410*c* of the PCU transfer sleeve 404 transfers the critical axial alignment of beta tube ports (further shown in FIG. 5) from PCU sleeve galleries (in traditional designs) to the galleries 415*a*, 415*b* and 415*c* of the propeller shaft 300, thereby eliminating the end float and other tolerance uncertainty associated with the gearbox thrust bearing and the associated system assembly tolerances.

The connections 416, 418 of FIG. 4A are openings and/or concentric tubes within the beta tube 130 and/or piston 420 that allow obtained hydraulic fluid to flow from the control valves 408 into one or more of the fine pitch chamber 422 and the coarse pitch chamber 424. In some examples, one or more of the connections 416, 418 may be annular connections. For example, the connection 416 is shown as an annular connection in FIG. 5, as further described below. When hydraulic fluid is pumped into the coarse pitch chamber 424, the piston 420 moves rearward in the orientation of FIG. 4A, causing the blade 106 to move to a coarse pitch angle. When the hydraulic fluid is pumped into the fine pitch chamber 422, the piston 420 moves forward in the orientation of FIG. 4A, causing the blade 106 to move to a fine pitch angle. However, during flight, the position of the beta tube 130 is monitored by a controller (e.g., the FADEC 180 and/or any other propeller controller (e.g., such as a propeller electronic controller (PEC))) and in combination with the position of the PCU valves 408 prevents the beta tube 130 from moving beyond a threshold toward the left (in the orientation of FIG. 4A) during flight (e.g., to prevent hydraulic fluid from the gallery 410*a* from entering the chamber 422 via the channel 416 to further move the beta tuber 130 toward the left). The coarse pitch chamber 424 and the fine pitch chamber 422 may include a piston bleed 423 structure to allow a small circulation of hydraulic fluid that has been pumped into the respective chambers 422, 424. When hydraulic fluid is pumped into one chamber and the beta tube 130 moves accordingly, hydraulic fluid from the other chamber is pumped back into the pumps 166*a*, 166*b* via the corresponding connection 416, 418, galleries 415*a*, 415*b*, 415*c*, openings 410*a*, 410*b*, 410*c*, and control valves 408.

The piston 420 is connected to a crosshead assembly 426 (also referred to as a mechanical assembly) to transfer axial movement (e.g., forward and rearward in the orientation of FIG. 4A) of the piston 420 and beta tube 130 into rotational movement about axis R for pitch adjustment of the blade 106. The blade 106 of FIG. 4A includes the counterweight 428. The counterweight 428 causes the blade 106 to naturally increase pitch when a rotational load is present on the blade 106.

Although FIG. 4A includes connections from the control valves 408 to the galleries 415*a*, 415*b*, 415*c* via the openings 410*a*, 410*b*, 410*c* of the PCU transfer sleeve 404, in some examples, the connections can be through a casing of the gearbox 132. For example, instead of having the openings 410*a*, 410*b*, 410*c* in the PCU transfer sleeve 404, the openings 410*a*, 410*b*, 410*c* may be included within the casing of the gearbox 132, while the PCU 170 does not include the openings and therefore may be located elsewhere on/n the powerplant. In such examples, the galleries 415*a*, 415*b*, 415*c* of the shaft 300 may be moved to a different location to align with the openings within the casing of the gearbox 132. In this manner, the control valves 408 can cause the hydraulic fluid from a pump to flow into the beta tube 130 via the openings of the gearbox 132 and the galleries.

Figure 4B:
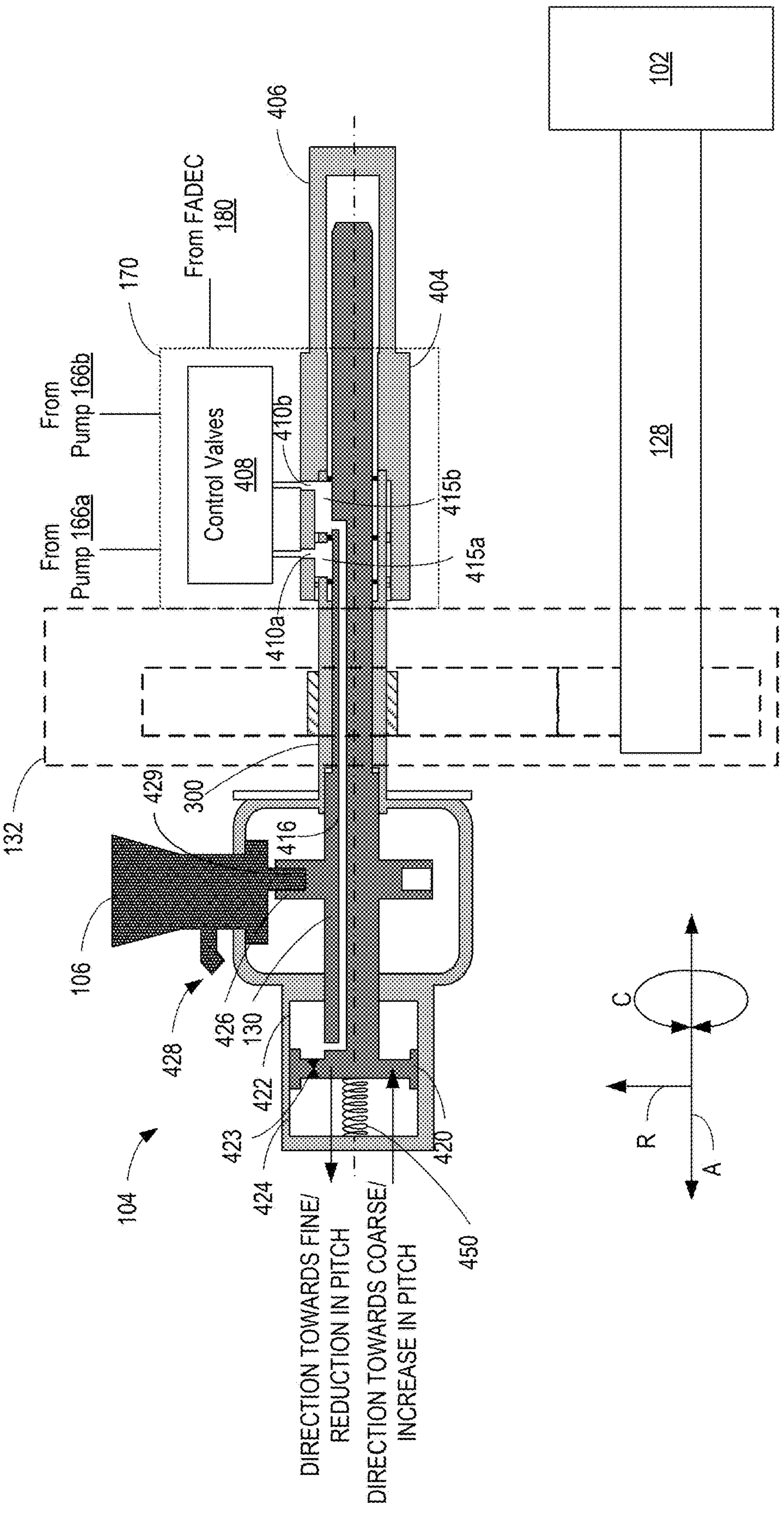
FIG. 4B illustrates an alternative example implementation with further details related to the blade, the beta tube, and the pitch control unit transfer sleeve of FIG. 3.

FIG. 4B illustrates an alternative embodiment of the structure of FIG. 4A. In FIG. 4B, the opening 410*c*, the gallery 415*c*, and the connection 418 are removed. Additionally, FIG. 4B includes an example spring 450. Components that are connected via a solid line are connected via a connection, a tube, a hose, a pipe, and/or other device that can transport hydraulic fluid. Any depiction of connections where hydraulic fluid can flow (e.g., solid lines, the connections 416, 418, etc.) may be formed with concentric tubes). In FIG. 4B, the components are illustrated as cross sections of the respective components. Although FIG. 4B is described in conjunction with the engine assembly 100 of FIG. 1A, examples disclosed herein may be implemented in conjunction with another type of turbo engine assembly, turbo propeller assembly, and/or any other engine and/or powerplant assembly with pitch control. For example, FIG. 4B can be described in conjunction with FIG. 1B, where the engine 102 is replaced with the turbomachine 168 of FIG. 1B, the LP shaft 128 is replaced with the LP shaft 179 of FIG. 1B, and the gearbox 132 is replaced with the gearbox 186 of FIG. 1B.

In FIG. 4B, the adjustment of the pitch of the blade 106 to a more coarse angle is accomplished via a combination of the spring 450 and the blade counterweights 428. For example, if the FADEC 180 determines that a coarser angle is desired, the FADEC 180 can adjust the control valves 408 to stop the flow of hydraulic fluid from the pump(s) 166*a*, 166*b* into the galleries 415*a*, 415*b*. If no additional hydraulic fluid is pumped into the galleries 415*a*, 415*b*, no additional hydraulic fluid will be pumped into the fine pitch chamber 422. If no additional hydraulic fluid is pumped into the fine pitch chamber 422, the spring 450 and the action of the counterweights 428 under centrifugal force applies to the piston 420 to push the beta tube 130 toward the right in the orientation of FIG. 4B and the hydraulic fluid currently in the fine pitch chamber 422 is forced back toward the pumps 166*a*, 166*b* via the control valves 408. Because the spring 450 moves the beta tube 130 toward the right in the orientation of FIG. 4B, the pitch of the blade 106 will move to a coarse pitch angle.

When the FADEC 180 determines that a finer pitch angle is desired, the FADEC 180 can adjust the control valves 408 to start the flow of hydraulic fluid from the pump(s) 166*a*, 166*b* into the galleries 415*a*, 415*b*, thereby allowing the hydraulic fluid to flow into the fine pitch chamber 422. The pressure from the hydraulic fluid is sufficient to overcome the force of the spring 450 and counterweight action (e.g., to override the ability of the spring 450 to push the beta tube 130 to the right in the orientation of FIG. 4B), causing the beta tube 130 to move to the left in the orientation of FIG. 4B, which changes the pitch angle of the blade 106 to a fine pitch angle.

Figure 5:
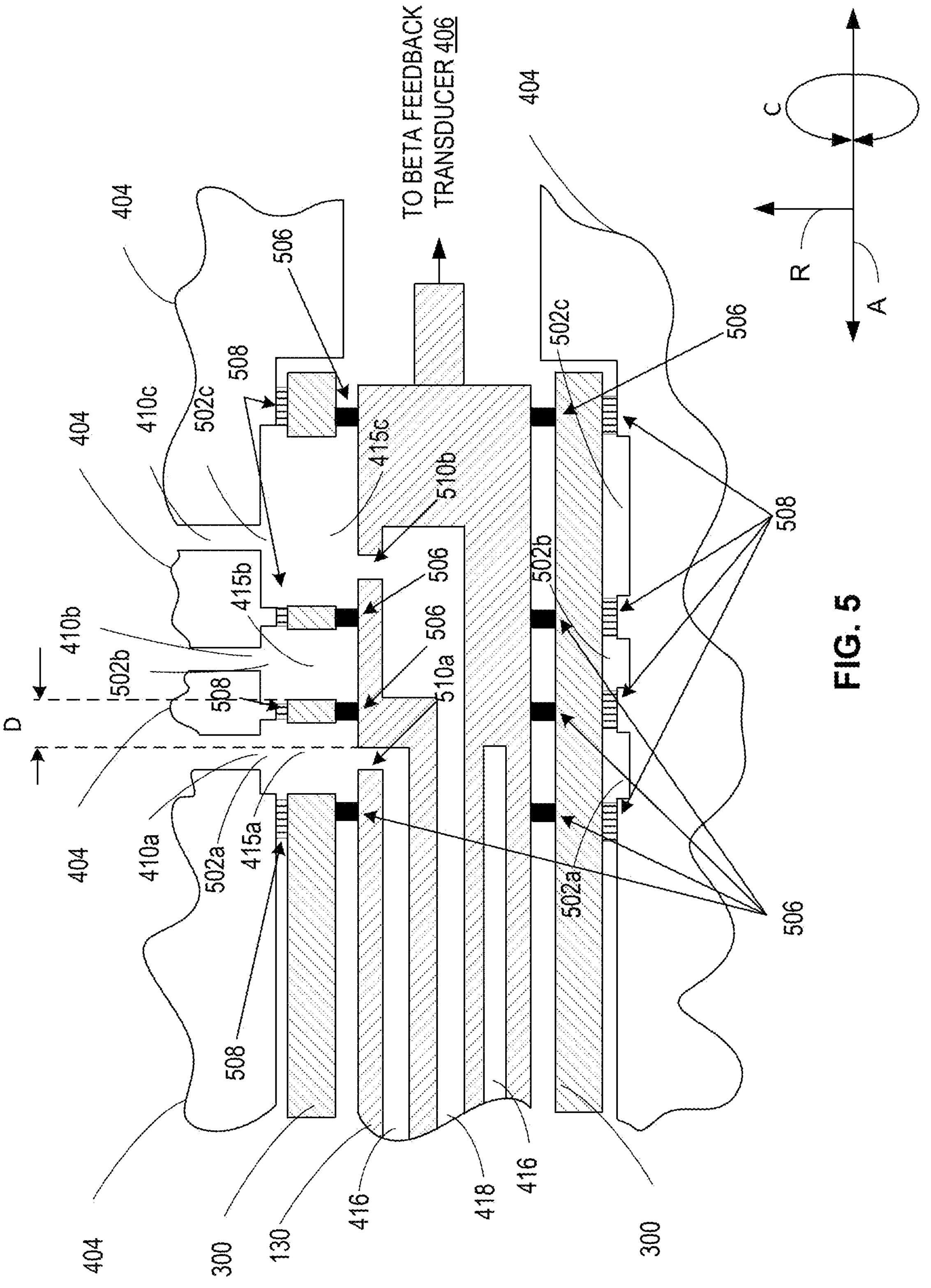
FIG. 5 illustrates a detailed cross-sectional view of a portion of a beta tube of the engine of FIG. 1A.

FIG. 5 illustrates a detailed cross-sectional view of a portion of the beta tube 130 in conjunction with the propeller shaft 300 and the openings 410*a*, 410*b*, 410*c* and the example galleries 415*a*, 415*b*, 415*c* of FIG. 4A. FIG. 5 includes the connections 416, 418 of FIG. 4A. FIG. 5 further includes the example PCU transfer sleeve 404 of FIG. 4A. FIG. 5 further includes example galleries 502*a*, 502*b*, 502*c*, example bushes 506 (also referred to as bushing seals), example labyrinth seals 508. FIG. 5 further includes example beta tube ports 510*a*, 510*b*. In the example of FIG. 5, the connection 416 is the typical annular connection. Although FIG. 5 is described in conjunction with components of FIG. 4A, FIG. 5 may be described in conjunction with components of FIG. 4B (e.g., by removing the connection 418, the opening 410*c*, the gallery 415*c*, the gallery 502*c* and the beta tube port 510*b*).

The galleries 502*a*, 502*b*, 502*c* of FIG. 5 of the PCU transfer sleeve 404 are fully annular open spaces that provide a path for hydraulic fluid from the discrete openings 410*a*, 410*b*, 410*c* to flow into the connection(s) 416, 418 via the galleries 415*a*, 415*b*, 415*c* and the beta tube ports 510*a*, 510*b* based on the position of the beta tube 130. For example, when the beta tube port 510*a* is aligned with the galleries 502*a*, 415*a*, hydraulic fluid can be pumped from the pump(s) 166*a*, 116*b* into the chamber 422 (e.g., via the control valves 408 and the opening 410*a*) to move the beta tube 130 into a ground pitch position. When the beta tube port 510*a* is aligned with the galleries 502*b*, 415*b*, hydraulic fluid can be pumped from the opening 410*b* into the chamber 422 to move the beta tube 130 into the fine pitch position but not further to the left into the ground pitch range. For example, the beta feedback transducer 406 and/or other combinations of sensors can sense the position of the beta tube and prevent the pump(s) 166*a*, 166*b* from pumping hydraulic fluid into the gallery 415*a*, which prevents the beta tube 130 from moving into the ground pitch range. When the beta tube port 510*b* is aligned with the galleries 502*c*, 415*c*, hydraulic fluid can be pumped from the opening 410*c* into the chamber 424 to move the beta tube 130 into a coarse position. Because the galleries 502*a*, 502*b*, 502*c* extend around the circumference of the propeller drive shaft 300, regardless of the position of the propeller drive shaft 300 the galleries remain coupled to beta tube ports 510*a*, 510*b* via the galleries 415*a*, 415*b*, 415*c*.

When implemented in the system of FIG. 4A, the control valves 408 can pump hydraulic fluid toward one or more of the openings 410*a*, 410*b*, 410*c* of the PCU transfer sleeve 404 connected to the annular galleries 502*a*, 502*b*, 502*c* formed by close radial tolerances between the propeller shaft 300 and the PCU transfer sleeve 404 and into one or more of the discrete galleries 415*a*, 415*b*, 415*c* of the propeller shaft 300. As described above, the galleries 415*a*, 415*b*, 415*c* are semi-annular or discrete and the galleries 502*a*, 502*b*, 502*c* are fully annular. Thus, even though the PCU transfer sleeve 404 is a rotationally fixed element with respect to the engine 102 (e.g., the PCU transfer sleeve 404 does not rotate with rotation of the beta tube 130) and the propeller shaft 300 rotates, hydraulic fluid can continuously, or substantially continuously be pumped into the connections 416, 418 as the propeller shaft 300 and beta tube 130 rotate. The galleries 415*a*, 415*b*, 415*c*, 502*a*, 502*b*, 502*c* are typically wider than the openings 410*a*, 410*b*, 410*c*. Also, referring to FIG. 5 the relationship between the position of the beta tube port 510*a* and the forward edge of the gallery 415*b* creates the "flight fine stop." Incorporating the galleries 415*a*, 415*b*, 415*c* within the propeller shaft 300 and incorporating the openings 410*a*, 410*b*, 410*c* and/or galleries 502*a*, 502*b*, 502*c* within the PCU transfer sleeve 404 transfers the critical axial alignment of beta tube ports 510*a*, 510*b* from PCU sleeve galleries 502*a*, 502*b* 502*c* (in traditional designs) to the galleries 415*a*, 415*b* and 415*c* within the propeller shaft 300, thereby eliminating the end float uncertainty associated with the gearbox thrust bearing and any change to the axial position of the PCU assembly or transfer sleeve.

Thus, any movement in the axial direction A caused by wearing of the bearings 302 of FIG. 3 or changes to the axial position of the PCU assembly does not result in a need to adjust the position of the propeller shaft 300 or beta tube 130 with respect to the PCU or gearbox casing. Because the propeller shaft 300 is rotatably fixed with the beta tube 130, any wearing of the bearings 302 results in substantially similar movement in both the propeller shaft 300 and the beta tube 130. Thus, there is no need to rig the beta tube 130 with respect to the propeller shaft 300. Because there is no need to rig the beta tube 130 with respect to the propeller shaft 300 (e.g., due to the same affect in position of the beta tube 130 and propeller shaft 300 caused by potential wearing of the bearing 302) and there is no need to rig the propeller shaft 300 with the PCU transfer sleeve 404 (e.g., due to the galleries 415*a*, 415*b*, 415*c*, 502*a*, 502*b*, 502*c* being wider than the openings 410*a*, 410*b*, 410*c*), then there is no need to rig the beta tube 130 due to wearing of the bearings 302 of FIG. 3. For example, the dimension D between the port 510*a* and the portion of the propeller shaft 300 separating galleries 415*a*, 415*b* must be controlled for proper operation. The dimension D defines a flight fine stop (e.g., a key interface for safe operation during flight). In traditional techniques, where the dimensional relationship is between the beta tube and the PCU transfer sleeve, to control the dimension D, rigging is required to account for variability of the gearbox end float and wear. For example, the actual blade pitch angle is determined by the axial relationship between the hub 104 and the crosshead assembly 426. In traditional techniques, controlling the dimension D is achieved by adjusting the axial distance between the beta tube port 510*a* and the crosshead assembly 426 for which they are configured as separate components. Thus, in traditional techniques, the pitch angle at which the beta tube port 510*a* becomes disconnected from 410*b* is controlled by the adjustment of this axial relationship. In such traditional techniques, such adjustment is required because the bearing wear/end float and PCU axial location are variables with wide/ill-defined tolerances. Thus, in traditional techniques, the blade angle at which the ports are disconnected, if this adjustment is not available, vary by a relatively large angle, which can be dangerous/unmanageable for the aircraft. Accordingly, in traditional techniques, the beta tube is typically threaded into the piston/crosshead assembly to achieve the fore/aft adjustment and then locked in place during rigging. In examples disclosed herein, the axial relationship between the crosshead assembly 426 and the port 415*b* is only dependent on the machined dimensions of the parts that make up the crosshead shaft, piston, beta tube (without adjustment) hub and gearbox shaft. These can all be machined using part machining dimensions to known, precise tolerances to fix the relationship between the beta tube 130 and port 510*a* and 415*b*. Accordingly, using examples disclosed herein, assembly tolerances with high variability and wear mechanisms are eliminated. Thus, the dimension D is only controlled by part machining dimensions.

In some traditional designs, the propeller shaft 300 does not extend over the galleries 502*a*, 502*b*, 502*c* and the beta tube ports 510*a*, 510*b*. Instead, the openings 410*a*, 410*b*, 410*c* of the PCU transfer sleeve 404 are fluidly coupled directly to the connections 416, 418 of the beta tube 130 via the galleries 502*a*, 502*b*, 502*c*. In such a structure, there are two different movements (e.g., rotational movement and axial movement) of the beta tube 130 with respect to the rotationally and axially static PCU transfer sleeve 404, then it is difficult to implement any type of seal because the seal would need to work with both axial and rotational movement of the beta tube 130 with respect to the PCU transfer sleeve 404. Thus, such traditional techniques correspond to some amount of hydraulic fluid leakage in the system. However, in the examples disclosed herein, the propeller shaft 300 is positioned between the fixed PCU transfer sleeve 404, thereby providing a layer of separation between the PCU transfer sleeve 404 and the beta tube 130. As described above, the propeller shaft 300 rotates with the beta tube 130, but does not move substantially in the axial direction. Thus, the only movement between the fixed PCU transfer sleeve 404 and the propeller shaft 300 is in the rotational direction. Additionally, because the propeller shaft 300 rotates with the beta tube 130, then the only movement between the propeller shaft 300 and the beta tube 130 is axial movement. Thus, in some examples, the annular bushes 506 can be placed between the propeller shaft 300 and the beta tube 130 to provide sealing while also working with the axial movement between the propeller shaft 300 and the beta tube 130. Also, in some examples, the annular labyrinth, or similar, seals 508 can be placed between the fixed PCU transfer sleeve 404 and the propeller shaft 300 to provide sealing while also working with rotational movement between the propeller shaft 300 and the PCU transfer sleeve 404. Thus, examples disclosed herein can prevent and/or mitigate hydraulic fluid leakage better than traditional techniques. In some examples, the bushes 506 and/or the labyrinth seals 508 may be removed to rely on close tolerance sealing with some amount of accepted leakage.

Although the example of FIG. 5 includes bushes 506 (or bushing seals) for sealing between axially translating components, the bushes 506 may be replaced with another type of seal that operates between axially translating components. Also, although the example of FIG. 5 includes labyrinth seals 508 for sealing between a rotationally translating components, the labyrinth seals 508 may be replaced with another type of seal that operates between rotationally translating components.

From the foregoing, it will be appreciated that example systems, apparatus, articles of manufacture, and methods have been disclosed to control pitch of a propeller blade. Examples disclosed herein adjust the hydraulic fluid coupling between control valves and a beta tube of a propeller assembly to remove the need of beta tube rigging. Additionally, examples disclosed herein reduce or eliminate the risk of the beta tube catching and/or binding. Thus, examples disclosed herein reduce the probability of system failure. Thus, the disclosed systems, apparatus, articles of manufacture, and methods are accordingly directed to one or more improvement(s) in the operation of a machine such as a computer or other electronic and/or mechanical device.

Example methods, apparatus, systems, and articles of manufacture including a rigging free beta tube are disclosed herein. Further aspects of the present disclosure are provided by the subject matter of the following clauses.

An apparatus comprises a propeller assembly including a blade and a propeller shaft, the propeller shaft including a first gallery; and a beta tube rotationally fixed to the propeller shaft, the beta tube axially translating with respect to the propeller shaft, the beta tube including a first connection, the first connection to provide hydraulic fluid to a pitch chamber to adjust a pitch of the blade to a first pitch angle, the first connection fluidly coupled to the first gallery of the propeller shaft based on a position of the beta tube.

The apparatus of the preceding claim, wherein the pitch chamber is a fine pitch chamber, the beta tube coupled to a piston, the piston to separate the fine pitch chamber from a coarse pitch chamber.

The apparatus of any one or more of the preceding claims, wherein the pitch chamber is a fine pitch chamber, wherein providing the hydraulic fluid to the fine pitch chamber causes the beta tube to move in a first axial direction and at least one of (a) providing hydraulic fluid to a coarse pitch chamber or (b) not providing hydraulic fluid to the fine pitch chamber causes the beta tube to move in a second axial direction.

The apparatus of any one or more of the preceding claims, wherein the beta tube includes a connection to a crosshead assembly to transfer axial movement of the beta tube into pitch adjustment of the blade.

The apparatus of any one or more of the preceding claims, wherein providing hydraulic fluid to the pitch chamber overrides an ability of the spring to cause the beta tube to adjust the pitch of the blade to the second pitch angle.

The apparatus of any one or more of the preceding claims, wherein: the propeller assembly includes a second gallery; and the beta tube includes a second connection to provide hydraulic fluid to a coarse pitch chamber to adjust the pitch of the blade to a second pitch angle, the second connection fluidly coupled to the second gallery of the propeller shaft.

The apparatus of any one or more of the preceding claims, further including a pitch control unit (PCU) transfer sleeve including a first opening and a second opening, the first opening fluidly coupled to the first gallery and one or more control valves, the second opening fluidly coupled to the second gallery and the one or more control valves.

The apparatus of any one or more of the preceding claims, further including a seal between the PCU transfer sleeve and the propeller shaft.

The apparatus of any one or more of the preceding claims, wherein the seal is a labyrinth seal.

The apparatus of any one or more of the preceding claims, wherein the first gallery is wider than the first opening and the second gallery is wider than the second opening.

The apparatus of any one or more of the preceding claims, wherein the PCU transfer sleeve does not rotate with rotation of the beta tube.

The apparatus of any one or more of the preceding claims, further including a seal between the propeller shaft and the beta tube.

The apparatus of any one or more of the preceding claims, wherein the seal is a bushing seal.

An apparatus comprises a blade; a propeller shaft coupled to the blade, the propeller shaft including a first gallery and a second gallery, the first and second galleries fluidly coupled to a pump via one or more control valves; and a beta tube rotationally fixed to the propeller shaft, the beta tube axially translating with respect to the propeller shaft, the beta tube including a first connection and a second connection, the first connection to provide hydraulic fluid to a first pitch chamber to adjust a pitch of the blade to a first pitch angle, the second connection to provide hydraulic fluid to a second pitch chamber to adjust the pitch of the blade to a second pitch angle, the first connection fluidly coupled to the first gallery of the propeller shaft based on a position of the beta tube, the second connection fluidly coupled to the second gallery of the propeller shaft.

The apparatus of the preceding claim, wherein the first pitch chamber is the second pitch chamber and the first connection is the second connection.

The apparatus of any one or more of the preceding claims, wherein the beta tube is coupled to a piston, the piston to separate the fine pitch chamber from the coarse pitch chamber.

The apparatus of any one or more of the preceding claims, wherein providing the hydraulic fluid to the first pitch chamber causes the beta tube to move in a first axial direction and providing hydraulic fluid to the second pitch chamber causes the beta tube to move in a second axial direction.

The apparatus of any one or more of the preceding claims, wherein the beta tube includes a connection to a crosshead assembly to transfer axial movement of the beta tube into pitch adjustment of the blade.

The apparatus of any one or more of the preceding claims, further including a labyrinth seal between a PCU transfer sleeve and the propeller shaft.

The apparatus of any one or more of the preceding claims, further including a seal between the propeller shaft and the beta tube.

The apparatus of any one or more of the preceding claims, wherein the seal is a bushing seal.

An engine comprises a low pressure shaft; a propeller assembly including a blade and a propeller shaft, the propeller shaft including a first gallery and a second gallery; a gearbox to translate first rotation of the low pressure shaft to second rotation of the propeller shaft, the blade to rotate with the second rotation; and a beta tube rotationally fixed to the propeller shaft, the beta tube axially translating with respect to the propeller shaft, the beta tube including a first connection and a second connection, the first connection to provide hydraulic fluid to a first pitch chamber to adjust a pitch of the blade to a first pitch angle, the second connection to provide hydraulic fluid to a second pitch chamber to adjust the pitch of the blade to a second pitch angle, the first connection fluidly coupled to the first gallery of the propeller shaft based on a position of the beta tube, the second connection fluidly coupled to the second gallery of the propeller shaft.

The engine of the preceding claim, further including a pitch control unit (PCU) transfer sleeve including a first opening and a second opening, the first opening fluidly coupled to the first gallery of the propeller shaft and one or more control valves, the second opening fluidly coupled to the second gallery of the propeller shaft and the one or more control valves.

The engine of any one or more of the preceding claims, wherein the beta tube is coupled to a piston, the piston to separate the first pitch chamber from the second pitch chamber.

The engine of any one or more of the preceding claims, wherein the first pitch chamber is the second pitch chamber and the first connection is the second connection.

It is noted that this patent claims priority from British Patent Application Number 2509740.3, which was filed on Jun. 19, 2025, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:

a propeller assembly including a blade and a propeller shaft, the propeller shaft including a first gallery; and a beta tube rotationally fixed to the propeller shaft, the beta tube axially translating with respect to the propeller shaft, the beta tube including a first connection, the first connection to provide hydraulic fluid to a pitch chamber to adjust a pitch of the blade to a first pitch angle, the first connection fluidly coupled to the first gallery of the propeller shaft based on a position of the beta tube.

2. The apparatus of claim 1, wherein the pitch chamber is a fine pitch chamber, the beta tube coupled to a piston, the piston to separate the fine pitch chamber from a coarse pitch chamber.

3. The apparatus of claim 1, wherein the pitch chamber is a fine pitch chamber, wherein providing the hydraulic fluid to the fine pitch chamber causes the beta tube to move in a first axial direction and wherein providing hydraulic fluid to a coarse pitch chamber causes the beta tube to move in a second axial direction.

4. The apparatus of claim 1, wherein the beta tube includes a connection to a crosshead assembly to transfer axial movement of the beta tube into pitch adjustment of the blade.

5. The apparatus of claim 1, wherein the propeller assembly includes a spring to cause the beta tube to adjust the pitch of the blade to a second pitch angle.

6. The apparatus of claim 5, wherein providing hydraulic fluid to the pitch chamber overrides an ability of the spring to cause the beta tube to adjust the pitch of the blade to the second pitch angle.

7. The apparatus of claim 1, wherein:

the propeller assembly includes a second gallery; and the beta tube includes a second connection to provide hydraulic fluid to a coarse pitch chamber to adjust the pitch of the blade to a second pitch angle, the second connection fluidly coupled to the second gallery of the propeller shaft.

8. The apparatus of claim 7, further including a transfer sleeve including a first opening and a second opening, the first opening fluidly coupled to the first gallery and one or more control valves, the second opening fluidly coupled to the second gallery and the one or more control valves.

9. The apparatus of claim 8, further including a seal between the transfer sleeve and the propeller shaft.

10. The apparatus of claim 9, wherein the seal is a labyrinth seal.

11. The apparatus of claim 8, wherein the first gallery is wider than the first opening and the second gallery is wider than the second opening.

12. The apparatus of claim 8, wherein the PCU transfer sleeve does not rotate with rotation of the beta tube.

13. The apparatus of claim 1, further including a seal between the propeller shaft and the beta tube.

14. The apparatus of claim 13, wherein the seal is a bushing seal.

15. An apparatus comprising:

a blade;

a propeller shaft coupled to the blade, the propeller shaft including a first gallery and a second gallery, the first and second galleries fluidly coupled to a pump via one or more control valves; and a beta tube rotationally fixed to the propeller shaft, the beta tube axially translating with respect to the propeller shaft, the beta tube including a first connection and a second connection, the first connection to provide hydraulic fluid to a first pitch chamber to adjust a pitch of the blade to a first pitch angle, the second connection to provide hydraulic fluid to a second pitch chamber to adjust the pitch of the blade to a second pitch angle, the first connection fluidly coupled to the first gallery of the propeller shaft based on a position of the beta tube, the second connection fluidly coupled to the second gallery of the propeller shaft.

16. The apparatus of claim 15, wherein the first pitch chamber is a fine pitch chamber, the second pitch chamber is a coarse pitch chamber, and further including a piston to separate the fine pitch chamber from the coarse pitch chamber.

17. The apparatus of claim 15, wherein the beta tube is coupled to a piston, the piston to separate the first pitch chamber from the second pitch chamber.

18. The apparatus of claim 15, wherein providing the hydraulic fluid to the first pitch chamber causes the beta tube to move in a first axial direction and providing hydraulic fluid to the second pitch chamber causes the beta tube to move in a second axial direction.

19. An engine comprising:

a low pressure shaft;

a propeller assembly including a blade and a propeller shaft, the propeller shaft including a first gallery and a second gallery;

a gearbox to translate a first rotation of the low pressure shaft into a second rotation of the propeller shaft, the blade to rotate with the second rotation; and a beta tube rotationally fixed to the propeller shaft, the beta tube axially translating with respect to the propeller shaft, the beta tube including a first connection and a second connection, the first connection to provide hydraulic fluid to a first pitch chamber to adjust a pitch of the blade to a first pitch angle, the second connection to provide hydraulic fluid to a second pitch chamber to adjust the pitch of the blade to a second pitch angle, the first connection fluidly coupled to the first gallery of the propeller shaft based on a position of the beta tube, the second connection fluidly coupled to the second gallery of the propeller shaft.

20. The engine of claim 19, further including a transfer sleeve including a first opening and a second opening, the first opening fluidly coupled to the first gallery of the propeller shaft and one or more control valves, the second opening fluidly coupled to the second gallery of the propeller shaft and the one or more control valves.

* * * * *